(12) United States Patent
Xu

(10) Patent No.: US 8,675,969 B2
(45) Date of Patent: Mar. 18, 2014

(54) METHOD AND APPARATUS FOR DETECTING PAGE BOUNDARIES

(75) Inventor: Lifeng Xu, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 383 days.

(21) Appl. No.: 13/037,132

(22) Filed: Feb. 28, 2011

(65) Prior Publication Data

US 2011/0211755 A1    Sep. 1, 2011

(51) Int. Cl.
*G06K 9/48* (2006.01)

(52) U.S. Cl.
USPC ........... 382/199; 382/289; 382/293; 358/474; 358/475

(58) Field of Classification Search
None
See application file for complete search history.

(56) References Cited

U.S. PATENT DOCUMENTS

| | | | | |
|---|---|---|---|---|
| 5,054,098 A * | 10/1991 | Lee | ............................... | 382/289 |
| 5,616,914 A * | 4/1997 | Matsuda | ..................... | 250/208.1 |
| 5,677,776 A * | 10/1997 | Matsuda et al. | ............... | 358/475 |
| 5,751,446 A * | 5/1998 | Fujioka | .......................... | 358/474 |
| 5,764,379 A * | 6/1998 | Matsuda et al. | ............... | 358/474 |
| 5,940,544 A * | 8/1999 | Nako | ............................. | 382/293 |
| 6,124,950 A * | 9/2000 | Honda | ........................... | 358/474 |
| 6,330,050 B1 * | 12/2001 | Takahashi et al. | ............... | 355/25 |
| 6,356,655 B1 * | 3/2002 | Sumikawa et al. | ........... | 382/175 |
| 6,721,066 B2 * | 4/2004 | Hirota et al. | .................... | 358/1.9 |
| 7,006,263 B2 * | 2/2006 | Takahashi | ...................... | 358/474 |
| 7,215,445 B2 * | 5/2007 | Braudaway et al. | .......... | 358/3.26 |
| 7,330,604 B2 * | 2/2008 | Wu et al. | ......................... | 382/289 |
| 7,477,426 B2 * | 1/2009 | Guan et al. | ..................... | 358/474 |
| 2002/0136451 A1 * | 9/2002 | Dolan et al. | ................... | 382/165 |
| 2004/0076341 A1 * | 4/2004 | Dolan | ............................ | 382/289 |
| 2005/0226503 A1 * | 10/2005 | Bailey et al. | ................... | 382/173 |
| 2008/0024845 A1 * | 1/2008 | Makino et al. | ................ | 358/538 |
| 2008/0091636 A1 * | 4/2008 | Ferlitsch | ............................ | 707/1 |

FOREIGN PATENT DOCUMENTS

| | | |
|---|---|---|
| JP | 5-161000 A | 6/1993 |
| JP | 5-161001 A | 6/1993 |
| JP | 5-161002 A | 6/1993 |
| JP | 6-164852 A | 6/1994 |

* cited by examiner

*Primary Examiner* — Vu Le
*Assistant Examiner* — Aklilu Woldemariam
(74) *Attorney, Agent, or Firm* — Canon USA Inc. IP Division

(57) ABSTRACT

The present invention discloses a method and apparatus for detecting page boundaries which are capable of accurately detecting complete page boundaries and dealing with many kinds of complex conditions. The method comprises: an edge image detecting step for detecting an edge image from the book document image; a horizontal page boundary detecting step for detecting top page boundaries and bottom page boundaries on the edge image; a binding center line detecting step for detecting the binding center line by searching an intersection point of the left page and the right page on the top page boundaries and the bottom page boundaries; a page width determining step for determining the page width of the book document image; and a vertical page boundary determining step for determining the left page boundary and the right page boundary by using the top page boundaries, the bottom page boundaries, the binding center line and the page width.

10 Claims, 12 Drawing Sheets

METHOD AND APPARATUS FOR DETECTING PAGE BOUNDARIES

BACKGROUND OF THE INVENTION

1. Field of the Invention

The present invention relates to an image processing method and the apparatus thereof. More specifically, the present invention relates to a method for detecting page boundaries of a book document image with binding curvatures in the center part and the apparatus thereof, which are mainly applied to images gotten from flat-bed scanners, MFP, etc.

2. Description of Related Art

One problem with an image scanner is that when the scanner scans a spread book document, the bound portion of the book rises above a glass platen and thus is away from the focal plane of the scanner. Therefore, the image of the bound portion is distorted, shadowed, blurred or deteriorated, which is well known in the art. For a relatively thick book document, this problem becomes more serious.

In order to compensate for image deterioration in the bound portion, detecting accurate page boundaries is a very important step for the compensation techniques based on image processing. For example, the techniques disclosed in Japanese Patent Laid-Open Nos. 5-161000, 5-161001, 5-161002 and 6-164852 need to measure the height of the entire document pages by detection of page boundaries, and then execute correction over the entire curved pages. However, none of the above documents teaches a specific method for detection of page boundaries.

U.S. Pat. No. 6,330,050 B1 discloses a page boundary recognizing means that compares, image line by image line, image density data with an adaptive threshold over a preselected range to thereby calculate the positions of page boundaries. However, the disclosed means only aims to find page boundaries in the bound portion and can not deal with some complex images. For example, this means might fail for book document image with a book cover larger than book pages. Moreover, all the above documents do not deal with the problem of finding vertical page boundaries.

In view of the above, there is a need for a method for detecting page boundaries of a book document image and the apparatus thereof which are capable of accurately detecting complete page boundaries of book document images and/or capable of dealing with many kinds of complex conditions, including the above-mentioned large book cover, other disturbance objects existing near page boundaries, etc.

SUMMARY OF THE INVENTION

It is therefore an object of the present invention to provide a method for detecting page boundaries and the apparatus thereof, wherein complete page boundaries of book document images can be accurately detected.

It is another object of the present invention to provide a method for detecting page boundaries and the apparatus thereof, wherein many kinds of complex conditions can be dealt with, including book covers larger than book pages, other disturbance objects existing near page boundaries, etc.

According to a first aspect of the present invention, there is provided a method for detecting page boundaries of a book document image, comprising: an edge image detecting step for detecting an edge image from the book document image; a horizontal page boundary detecting step for detecting top page boundaries and bottom page boundaries on the edge image; a binding center line detecting step for detecting the binding center line by searching an intersection point of the left page and the right page on the top page boundaries and the bottom page boundaries; a page width determining step for determining the page width of the book document image; and a vertical page boundary determining step for determining the left page boundary and the right page boundary by using the top page boundaries, the bottom page boundaries, the binding center line and the page width.

The horizontal page boundary detecting step further comprises: straight line segment detecting step for detecting a plurality of straight line segments on the edge image; straight line part selecting step for selecting the straight line parts of the top page boundaries and the bottom page boundaries from the plurality of straight line segments; and curvature part detecting step for detecting the curvature parts of the top page boundaries and the bottom page boundaries on the edge image based on the straight line parts of the top page boundaries and the bottom page boundaries.

Preferably, in the straight line segment detecting step, a pre-processing described later is performed.

Preferably, in the straight line part selecting step, the selection is performed based on some selecting criteria described later.

According to a second aspect of the present invention, there is provided an apparatus for detecting page boundaries of a book document image, comprising: an edge image detecting means for detecting an edge image from the book document image; a horizontal page boundary detecting means for detecting top page boundaries and bottom page boundaries on the edge image; a binding center line detecting means for detecting the binding center line by searching an intersection point of the left page and the right page on the top page boundaries and the bottom page boundaries; a page width determining means for determining the page width of the book document image; and a vertical page boundary determining means for determining the left page boundary and the right page boundary by using the top page boundaries, the bottom page boundaries, the binding center line and the page width.

The horizontal page boundary detecting means further comprises: straight line segment detecting means for detecting a plurality of straight line segments on the edge image; straight line part selecting means for selecting the straight line parts of the top page boundaries and the bottom page boundaries from the plurality of straight line segments; and curvature part detecting means for detecting the curvature parts of the top page boundaries and the bottom page boundaries on the edge image based on the straight line parts of the top page boundaries and the bottom page boundaries.

Preferably, in the straight line segment detecting means, a pre-processing described later is performed.

Preferably, in the straight line part selecting means, the selection is performed based on some selecting criteria described later.

Further objects, features and advantages of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the present invention.

DESCRIPTION OF THE EMBODIMENTS

Exemplary embodiments of the present invention will now be described in detail with reference to the drawings. It shall be noted that the components and steps set forth in the embodiments do not limit the scope of the present invention unless it is otherwise specifically stated.

The following description is merely illustrative in nature and is in no way intended to limit the present invention, its applications or uses.

Techniques, methods and apparatus known by one of ordinary skill in the relevant art may not be discussed in detail, but are intended to be part of the specification where appropriate.

Page Model

Figure 1:
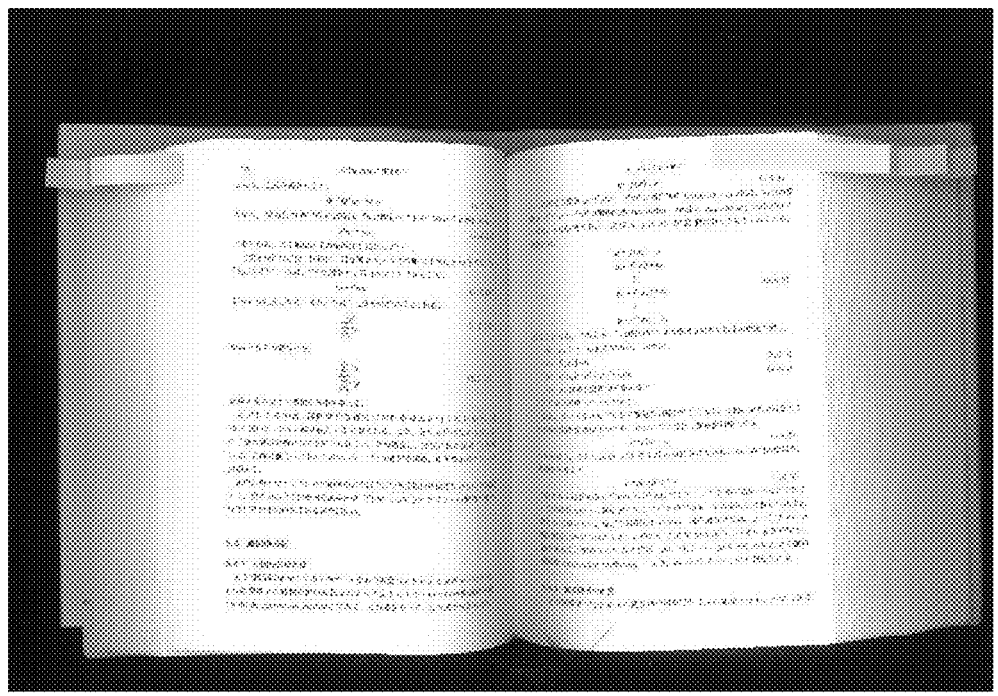
FIG. 1 illustrates an exemplary book document image.

FIG. 1 illustrates an exemplary spread book document image obtained from an image scanner. As is obvious from FIG. 1, the image has the left page and the right page, and the image of the center bound portion is distorted, shadowed, blurred or deteriorated to some extent. Moreover, disturbance objects, in this case labels and a large book cover, exist near page boundaries.

Figure 2:
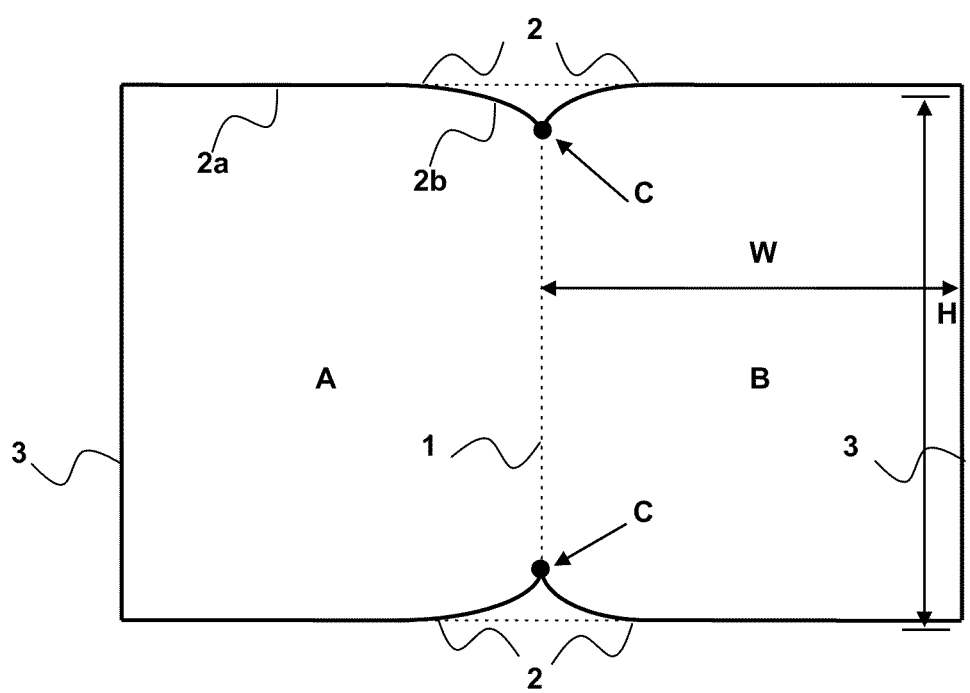
FIG. 2 illustrates a page model of the book document image.

FIG. 2 illustrates a page model of the book document image. In FIG. 2, reference signs A and B denote the left page and the right page, respectively. Reference sign C denotes the intersection points of the left page and the right page on the top page boundaries and the bottom page boundaries. In addition, reference sign 1 denotes the binding center line. Reference sign 2 denotes the horizontal page boundaries, wherein the ones on top side are the top page boundaries, and the ones on bottom side are the bottom page boundaries. As can be seen from FIG. 2, each horizontal page boundary can be modelled by two parts: the straight line part 2a, and the curvature part 2b near the binding center line 1. Furthermore, on the top page boundaries, the curvature parts are below the straight line parts; while on the bottom page boundaries, the curvature parts are above the straight line parts. Moreover, reference sign 3 denotes the vertical page boundaries, including the left page boundary and the right page boundary. The vertical page boundaries can be approximately deemed as straight lines. Finally, reference sign W denotes the page width of the right page, which is the vertical distance between the binding center line and the right page boundary. The page width of the left page is similarly defined. Reference sign H denotes the page height of the right page, which is the vertical distance between the top page boundary and the bottom page boundary of the right page. The page height of the left page is similarly defined.

Hereinafter, description will be made of a page boundary detecting method and apparatus according to the present invention based on the page model shown in FIG. 2.

Page Boundary Detecting Method

A general process of a page boundary detecting method according to the present invention will be described with reference to FIG. 3.

Figure 3:
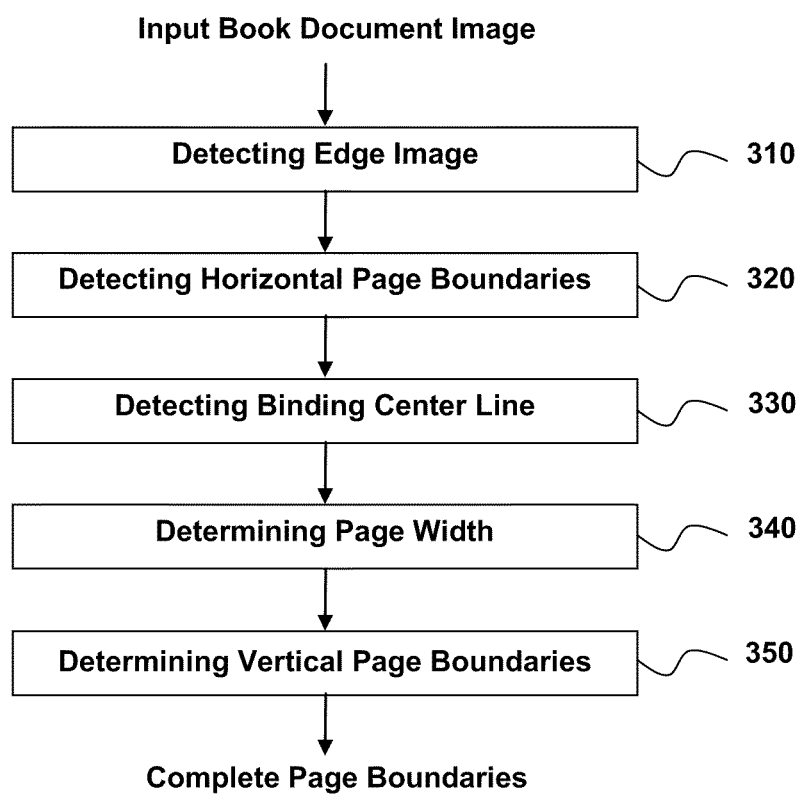
FIG. 3 is a flowchart showing an exemplary general process of implementing the page boundary detecting method according to the present invention.

FIG. 3 is a flowchart 300 showing an exemplary general process of implementing the page boundary detecting method according to the present invention.

At step 310, an edge image is detected from the input book document image.

At step 320, horizontal page boundaries including top page boundaries and bottom page boundaries are detected from said edge image.

At step 330, the binding center line is detected through searching an intersection point of the left page and the right page on the top page boundaries and the bottom page boundaries.

At step 340, the page width of the book document image is determined.

At step 350, vertical page boundaries including the left page boundary and the right page boundary are determined based on the top page boundaries, the bottom page boundaries, the binding center line and the page width.

Finally, complete and accurate page boundaries are determined for the input book document image through the implementation of the above-mentioned steps. Based on the complete page boundaries determined in the above manner, the distortion of the image portion representative of the center bound portion may be further corrected.

The flowchart in FIG. 3 briefly illustrates the basic steps of the page boundary detecting method according to the present invention. Hereinafter, more detailed description of exemplary processes for the above various steps will be made.

Figure 4:
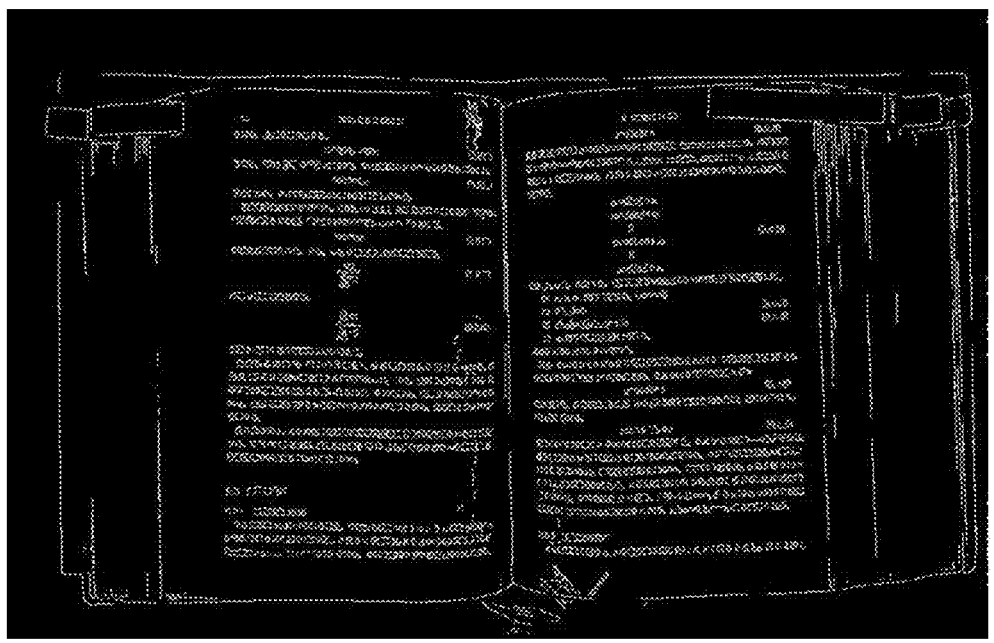
FIG. 4 illustrates the edge image of the book document image shown in FIG. 1.

The first step, i.e., step 310, is to detect an edge image from the input book document image. In the field of image processing, many edge detecting algorithms are well-known, such as Sobel operator, Canny operator, etc. In the created binary edge image, each pixel represents whether or not that point is an edge point. At each edge point, the image brightness changes sharply or more formally has prominent discontinuities. FIG. 4 illustrates an exemplary edge image of the book document image shown in FIG. 1.

Next, an exemplary process of detecting horizontal page boundaries according to the present invention will be described in more detail with reference to FIG. 5.

Figure 5:
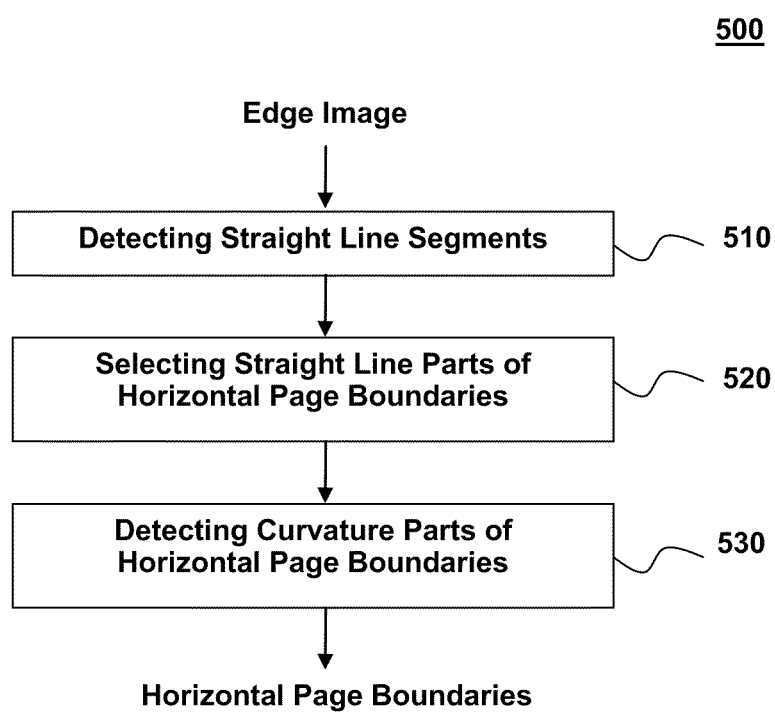
FIG. 5 is a flowchart showing an exemplary process of the horizontal page boundary detecting step according to the present invention.

As shown in the flowchart 500 of FIG. 5, first, at step 510, a plurality of straight line segments on the edge image are detected. As is well-known to persons skilled in the art of image processing, a plurality of straight line segments can be easily detected by performing, for example, Hough Transform on the edge image.

In the present invention, in order to make the straight line segment detecting processing faster and in order to detect only straight line segments that are very likely to be on the horizontal page boundaries, the following pre-processing on the edge image is preferably employed.

Here, it is assumed that background region of the book document image is black; also, there is not much noise in the background region.

On the top side of the edge image, the process may be carried out as follows. For each column of the edge image, search is performed from top to bottom, and only the first several edge points (e.g., the first three edge points) that are met are reserved. It shall be further noted that, here, each reserved edge point is required to be with darker color on the top side of it and lighter color on the bottom side of it. The principle for this pre-processing is evident from FIG. 1. In the book document image shown in FIG. 1, due to the presence of a book cover which is larger than the book pages in size, the first edge point met may not belong to the top page boundaries; rather, it may belong to the book cover. In other situations, there is also the possibility that the first edge point met may belong to disturbance objects existing near page boundaries. Therefore, several edge points that are met first need to be reserved. Moreover, since the background region of the book document image is black, the image region belonging to things such as the book cover is usually lighter, and the image region belonging to the vicinity of page boundaries is even lighter, in the case of top page boundaries, it is required that the top side of each reserved edge point has darker color while the bottom side thereof has lighter color.

The case for the bottom side of the edge image is similar. However, here, for each column of the edge image, search is performed from bottom to top instead, and only the first several edge points (e.g., the first three edge points) that are met are reserved. Another difference is that, each reserved edge point is required to be with darker color on the bottom side of it and lighter color on the top side of it, which is contrary to the case of the top side.

Incidentally, in the above pre-processing, the first three edge points are reserved for each column of the edge image when searching from top to bottom or when searching from bottom to top. It shall be noted that, however, the number of reserved edge points is only exemplary and does not intend to limit the protection scope of the present invention. Actually, depending on actual situations, persons skilled in the art may take two edge points, four edge points or more edge points.

After the above pre-processing, the plurality of straight line segments are detected by using only the reserved edge points when searching from top to bottom and the reserved edge points when searching from bottom to top. For example, Hough Transform is performed on all the reserved edge points to get a plurality of straight line segments. The computation amount for the Hough Transform after the above pre-processing is considerably reduced, which can contribute to the enhancement of the processing speed of the page boundary detecting method of the present invention.

Next, at step 520, the straight line parts of top page boundaries and bottom page boundaries are selected from among the plurality of straight line segments detected at step 510.

From the plurality of detected straight line segments, four straight line segments are selected as the straight line parts of horizontal page boundaries, corresponding to the top and bottom page boundaries of the left page, the top and bottom page boundaries of the right page respectively. The selection criteria are as follows.

a) On the top side, the straight line segment of the top page boundary of the left page and the straight line segment of the top page boundary of the right page (which constitute a pair of straight line segments) are approximately on the same straight line (it is not necessary that they are exactly on the same straight line). Similar criterion applies to the bottom side. That is to say, on the bottom side, the straight line segment of the bottom page boundary of the left page and the straight line segment of the bottom page boundary of the right page are approximately on the same straight line.

b) On the top side, if more than one pairs of straight line segments satisfy criterion a), the vertical distance between the upper pair of straight line segments and the lower pair of straight line segments is calculated. If the calculated vertical distance is larger than a pre-determined threshold D (for example, 50 pixels, however, this threshold may be determined based on actual situations and needs), the upper pair of straight line segments is chosen as the straight line parts of top page boundaries; otherwise the lower pair of straight line segments is chosen as the straight line parts of top page boundaries. On the other hand, on the bottom side, in case more than one pairs of straight line segments satisfy criterion a), if the calculated vertical distance is larger than a pre-determined threshold D, the lower pair of straight line segments is chosen as the straight line parts of bottom page boundaries; otherwise the upper pair of straight line segments is chosen as the straight line parts of bottom page boundaries.

Incidentally, when detecting straight line segments at step 510, it may be controlled so as to ensure that at most two straight line segments are detected for each of the top side and the bottom side of the left page and for each of the top side and the bottom side of the right page. For example, for the upper left portion of the edge image in FIG. 4, if three or more straight line segments are detected, only the two longest ones are kept. In such a case, at most two pairs of straight line segments may satisfy criterion a). However, it is readily apparent to persons skilled in the art that the present invention is not limited thereto.

Figure 6:
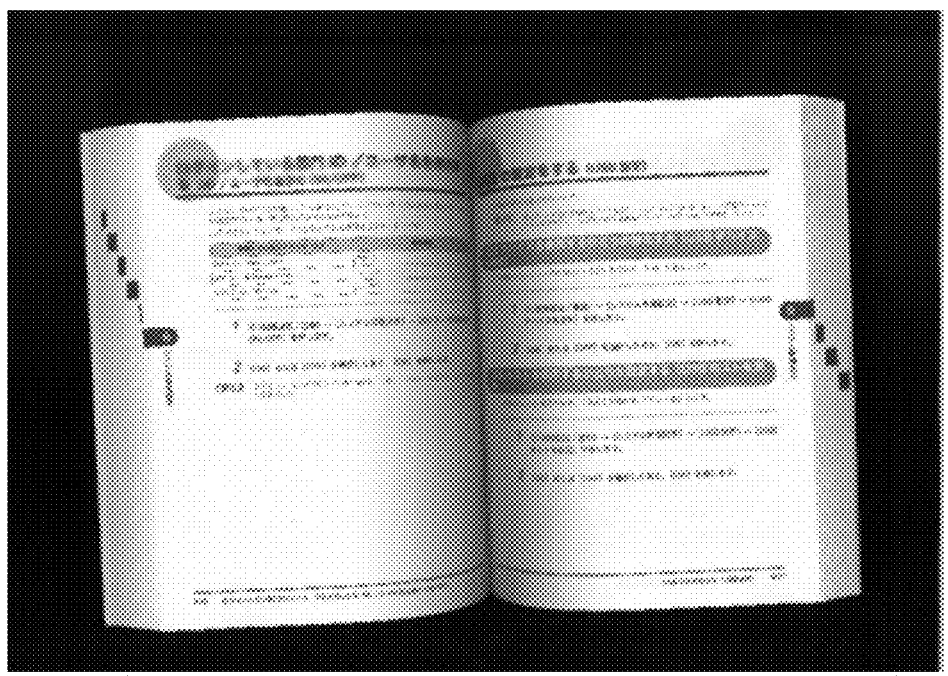
FIG. 6 illustrates the principle of selecting the straight line parts of horizontal page boundaries in case of disturbance objects existing near page boundaries.

FIG. 6 illustrates an example of selecting the straight line parts of horizontal page boundaries from multiple pairs of straight line segments satisfying the above criterion a). In FIG. 6, in addition to the pair of straight line segments representing top page boundaries, the printed straight line pair in bold on top of the left and right pages can also be detected as another pair of straight line segments. In this case, the vertical distance between these two pairs is larger than the pre-determined threshold D, and thus the upper pair of straight line segments is appropriately chosen as the straight line parts of top page boundaries. On the other hand, on the bottom side of FIG. 6, the lower pair of straight line segments is appropriately chosen as the straight line parts of bottom page boundaries.

In contrast, refer back to FIG. 1, there is no such printed straight line pair in bold on top of the left and right pages, instead, there is a book cover which is larger than book pages in size and thus the book cover also shows up in the book document image. Therefore, in FIG. 1, in addition to the pair of straight line segments representing top page boundaries, the pair of straight line segments in the vicinity of the top page boundaries representing the book cover can also be detected as another pair of straight line segments. In this case, the vertical distance between these two pairs is smaller than the pre-determined threshold D, and thus the lower pair of straight line segments is appropriately chosen as the straight line parts of top page boundaries. Furthermore, it shall be noted that, in FIG. 1, the labels on top of the book pages can also be detected as potential straight line segment candidates. In case of the labels, however, the vertical distance thereof will be larger than the pre-determined threshold D, and thus straight line segments representing the labels will not be selected as the straight line parts of top page boundaries, similarly to the case of the printed straight line pair in bold near the horizontal page boundaries.

The above criteria ensure that even when there are book covers or disturbance objects (such as the labels and the printed straight line pair in bold near the horizontal page boundaries), correct horizontal page boundaries can still be located appropriately. Therefore, compared to the page boundary detecting method in the prior arts, the page boundary detecting method according to the present invention can deal with various kinds of more complex conditions.

After the straight line parts of horizontal page boundaries are selected, at step 530, the curvature parts of top page boundaries and bottom page boundaries are detected on the edge image based on the straight line parts of top page boundaries and bottom page boundaries.

Figure 7:
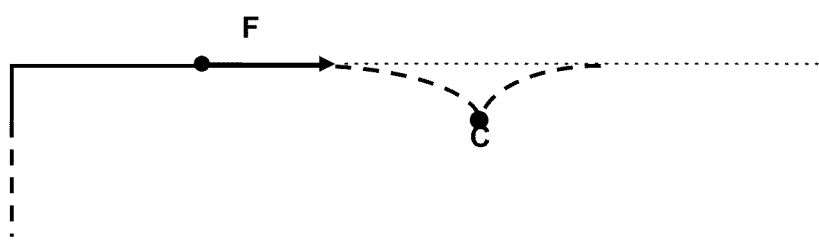
FIG. 7 illustrates the process of tracking the curvature parts of horizontal page boundaries.

More specifically, the curvature parts may be tracked according to the position relationships between the straight line parts and the curvature parts. FIG. 7 gives the case of the top page boundary of the left page as an example. The process can be carried out as follows. From an initial point on the straight line part of the top page boundary of the left page (e.g., this initial point may be located near the binding center line, but its position is not limited thereto), searching edge points toward right-down direction (see the arrow F in FIG. 7) so as to get the curvature part of the top page boundary of the left page. The curvature part of the top page boundary of the right page, the bottom page boundary of the left page and the bottom page boundary of the right page can be detected similarly (the searching will be performed toward the left-down direction, the right-up direction and the left-up direction, respectively). Up till now, the horizontal page boundaries are detected.

Next, according to step 330 of the flowchart of FIG. 3, the binding center line is detected. As shown in FIG. 7, the intersection points of the left page and the right page on the horizontal page boundaries (FIG. 7 only illustrates the intersection point C on the top page boundaries) may be easily determined. After the intersection point, e.g., the intersection point C on the top side as shown in FIG. 7, is determined, the binding center line is determined by drawing a straight line that passes this intersection point and is orthogonal to the straight line part of the horizontal page boundaries (e.g. the top page boundaries). Incidentally, though the above process employing the intersection point on the top side and the straight line part of the top page boundaries to detect the binding center line may be more accurate, the present invention is not limited thereto. In addition, theoretically, the binding center line may also be detected by connecting the intersection point on the top page boundaries and the intersection point on the bottom page boundaries. But this process may not quite accurate, since it is usually hard to find the intersection points precisely.

After the binding center line is detected, the page width of the book document image is determined at step 340, as shown in FIG. 3.

In order to determine the page width, various processes may be employed. For example, one method for getting the page width is to get a value of width-to-height ratio of the book document from a user interface. Thereinafter, the page height is calculated according to the vertical distance between the straight line parts of the top page boundary and the bottom page boundary. Finally, the page width maybe calculated according to the obtained width-to-height ratio and the calculated page height.

Figure 8A:
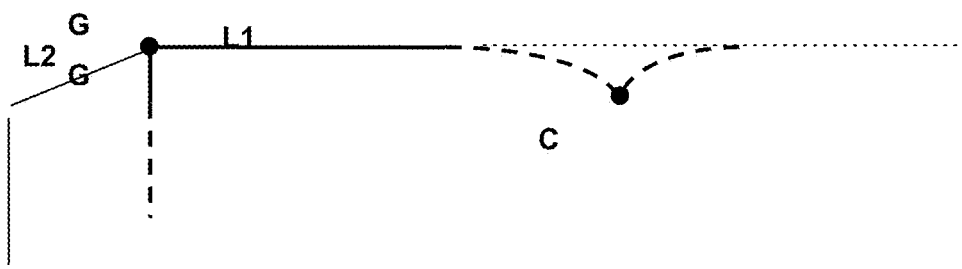
FIG. 8(a) illustrates a schematic process of detecting page corner point.
Figure 8B:
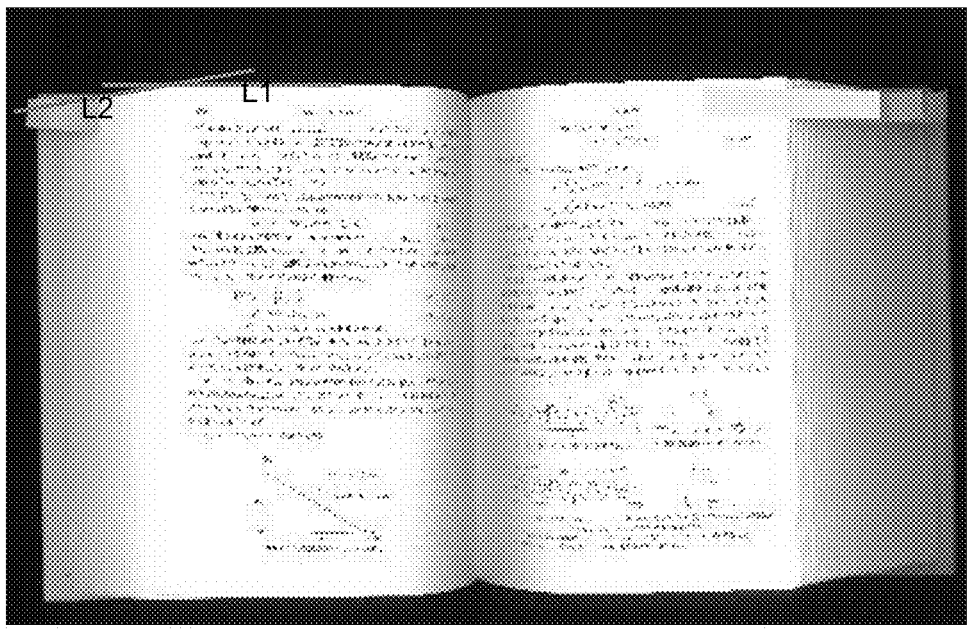
FIG. 8(b) illustrates an example process of detecting page corner point.

Another method for getting the page width is based on the detection of the page corner points. FIG. 8(*a*) gives the case of the upper left page corner point as an example, but it readily occurs to persons skilled in the art that, all the other page corner points, including the upper right page corner point, the lower left page corner point and the lower right page corner point, may be detected by a similar method. In FIG. 8(*a*), the upper left page corner point G is the intersection point of two lines L1 and L2. More specifically, line L1 is the straight line part of the top page boundary of the left page. Line L2 is determined by the following process: searching edge points that are connected to line L1 (toward left in the case of FIG. 8(*a*)); removing edge points that are on line L1; finally, fitting a straight line on the rest of the found edge points after removal so as to obtain line L2. After lines L1 and L2 are obtained, the upper left page corner point G can be easily determined by the intersection point of lines L1 and L2. FIG. 8(*b*) illustrates an example process of detecting page corner point, which corresponds to the schematic process of detecting page corner point in FIG. 8(*a*). Once the page corner points are detected, the page width can be easily calculated according to the detected page corner points and the detected binding center line. More specifically, the page width is the vertical distance between the detected page corner points and the binding center line.

It is to be noted that, due to scanning deformation, the page width of the left page and the page width of the right page may not be the same. Therefore, in the above method for getting the page width based on the detection of the page corner points, it needs to calculate the page widths of the left page and the right page separately (incidentally, though the process employing the page corner points on the top side may be more accurate, the present invention is not limited thereto). In comparison, in the above method for getting the page width based on the width-to-height ratio and the page height, the calculation needs to be performed only once. It shall be noted that the aforementioned methods are merely illustrative in nature.

Next, according to the flowchart of FIG. 3, the vertical page boundaries are determined based on the top page boundaries, the bottom page boundaries, the binding center line and the page width obtained in the foregoing various steps 320-340.

More specifically, an exemplary process of finding the vertical page boundaries may be carried out as follows. The horizontal positions of the vertical page boundaries are determined by referring to the binding center line and the page width (refer to FIG. 2). Then, the vertical page boundaries can be determined by drawing two vertical lines (one is for the left page boundary, and the other is for the right page boundary) that are orthogonal to the straight line parts of horizontal page boundaries at the determined horizontal positions. In case page corner points have been detected earlier in step 340, the vertical page boundaries may be directly determined by drawing two vertical lines that are orthogonal to the straight line parts of the horizontal page boundaries at one left page corner point and one right page corner point (incidentally, though the process employing the page corner points on the top side may be more accurate, the present invention is not limited thereto). In this case, it is not necessary to determine the page width in step 340.

Figure 9:
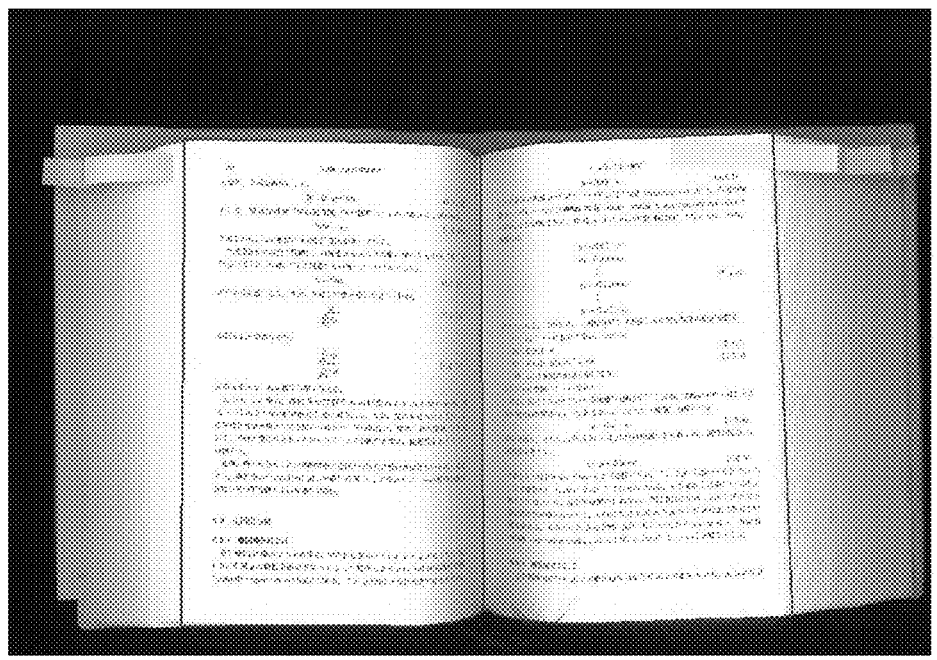
FIG. 9 illustrates one exemplary result of the page boundary detecting method according to the present invention.
Figure 10:
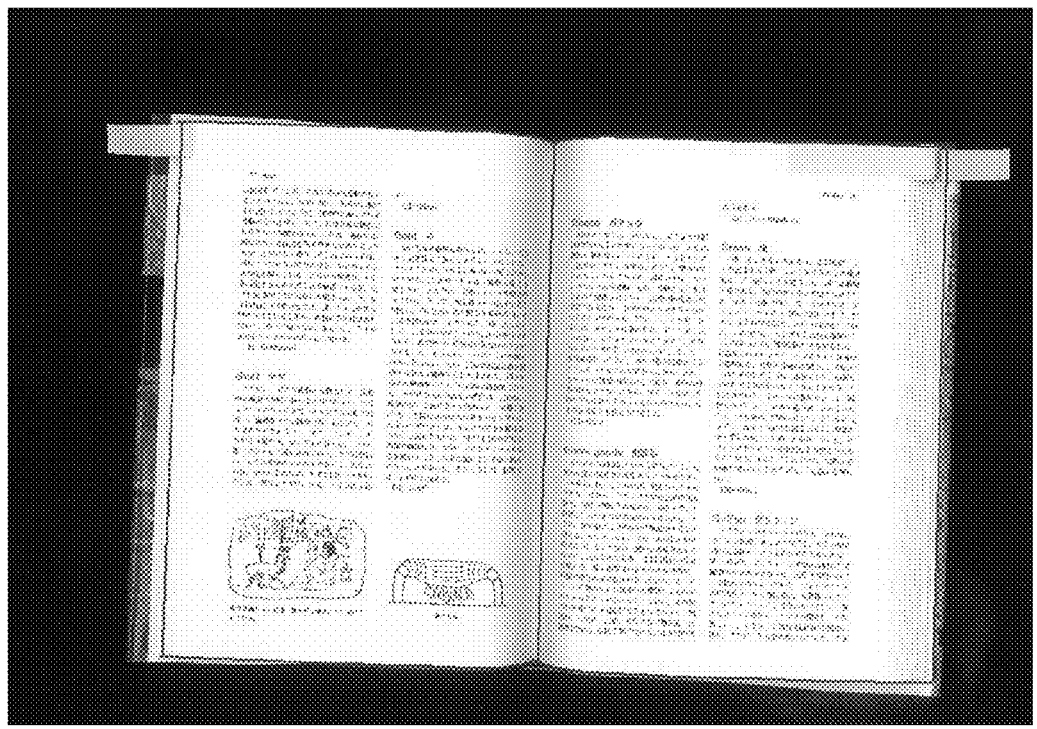
FIG. 10 illustrates another exemplary result of the page boundary detecting method according to the present invention.

FIGS. 9 and 10 illustrate exemplary results of page boundary detecting of the present invention. More specifically, FIG. 9 illustrates the page boundary detecting result of the book document image in FIG. 1 obtained using the method of the present invention. FIG. 10 illustrates the page boundary detecting result of another book document image obtained using the method of the present invention. The book in FIG. 10 is relatively thin compared to that in FIG. 9. As can be seen from these figures, even in various complex conditions wherein there exist book cover (refer to FIG. 9) or disturbance objects near the page boundaries (refer to the labels in FIGS.

9 and 10), the page boundary detecting method according to the present invention can still accurately detect complete page boundaries of book document images. This is greatly advantageous over the page boundary detecting methods of the prior arts.

Page Boundary Detecting Apparatus

Figure 11:
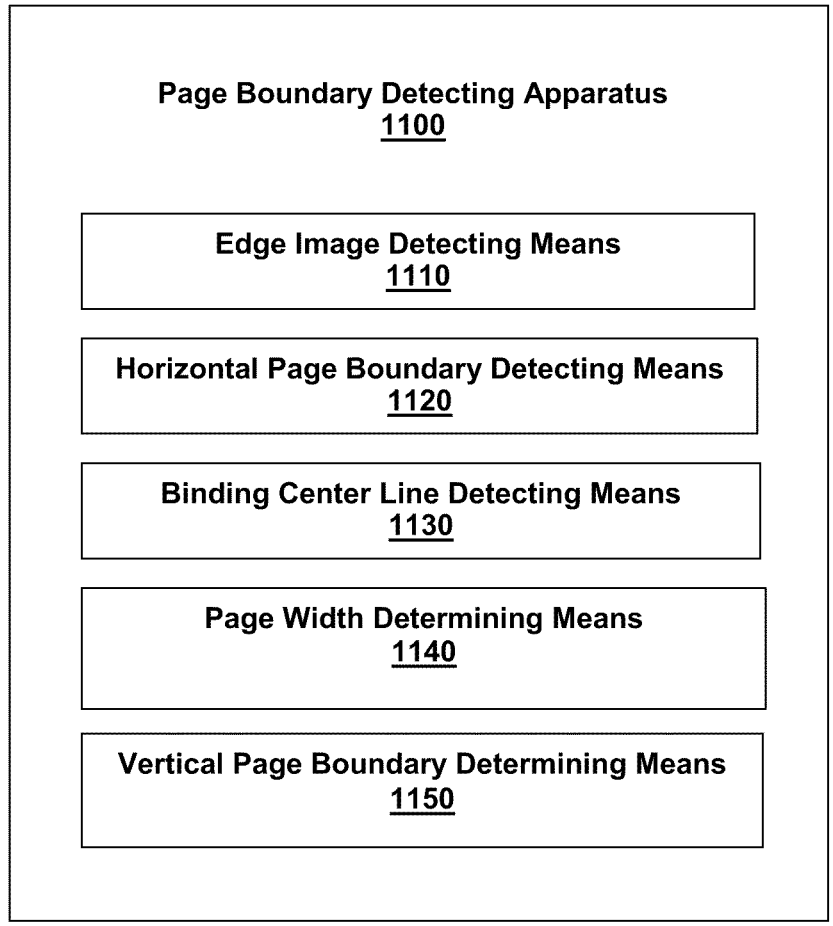
FIG. 11 is a block diagram showing an exemplary general configuration of the page boundary detecting apparatus according to the present invention.

Below, an exemplary page boundary detecting apparatus according to the present invention will be described briefly. FIG. 11 is a block diagram showing an exemplary general configuration of the page boundary detecting apparatus according to the present invention.

As can be seen in FIG. 11, the page boundary detecting apparatus 1100 according to the present invention may comprise an edge image detecting means 1110, a horizontal page boundary detecting means 1120, a binding center line detecting means 1130, a page width determining means 1140 and a vertical page boundary determining means 1150. Apparently, the page boundary detecting apparatus 1100 may also comprise other means which are not shown in FIG. 11 according to actual needs.

The edge image detecting means 1110 is configured to detect an edge image from the input book document image. The edge detecting method employed by the edge image detecting means 1110 can be Sobel operator, Canny operator, etc.

Figure 12:
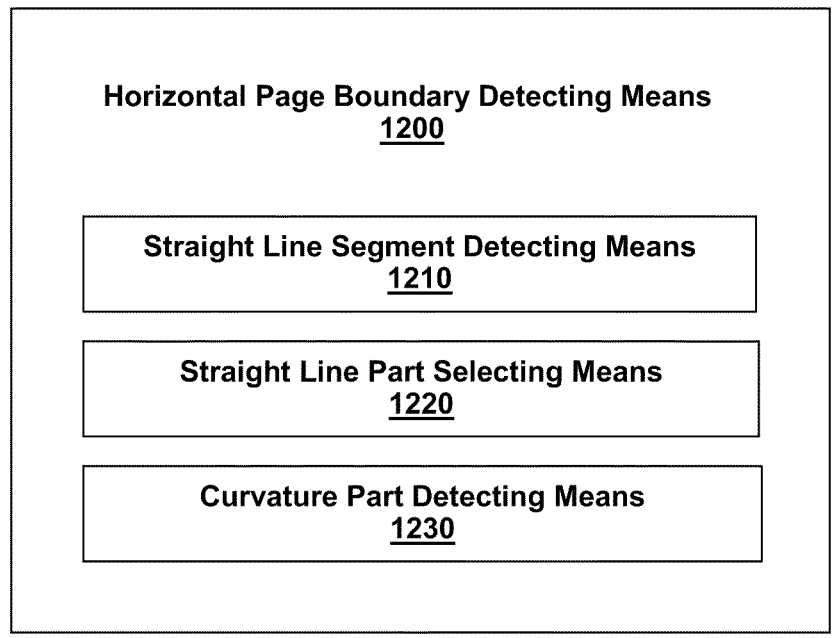
FIG. 12 is a block diagram showing an exemplary configuration of the horizontal page boundary detecting means according to the present invention.

The horizontal page boundary detecting means 1120 is configured to detect top page boundaries and bottom page boundaries from the edge image. FIG. 12 is a block diagram showing an exemplary general configuration of the horizontal page boundary detecting means according to the present invention. The horizontal page boundary detecting means 1200 shown in FIG. 12 comprises a straight line segment detecting means 1210, a straight line part selecting means 1220 and a curvature part detecting means 1230. More specifically, the straight line segment detecting means 1210 detects a plurality of straight line segments on the edge image, preferably after the aforementioned pre-processing. The straight line part selecting means 1220 selects the straight line parts of top page boundaries and bottom page boundaries from among the plurality of straight line segments detected by applying the aforementioned selection criteria a) and b). The curvature part detecting means 1230 detects the curvature parts of top page boundaries and bottom page boundaries on the edge image based on the straight line parts of top page boundaries and bottom page boundaries. Finally, horizontal page boundaries can be detected by the horizontal page boundary detecting means 1120.

Now come back to FIG. 11. The binding center line detecting means 1130 is configured to detect the binding center line by searching an intersection point of the left page and the right page on the top page boundaries and the bottom page boundaries.

The page width determining means 1140 is configured to determine the page width of the book document image. The page width determining means 1140 may adopt various different methods to determine the page width. One method is to get a value of width-to-height ratio of the book document from a user interface, calculate the page height according to the vertical distance between the straight line parts of the top boundary and the bottom boundary, and obtain page width according to the width-to-height ratio and the page height. The other method is based on the detection of the page corner point, as described earlier.

The vertical page boundary determining means 1150 is configured to determine the left page boundary and the right page boundary based on the top and bottom page boundaries, the binding center line and the page width determined by the horizontal page boundary detecting means 1120, the binding center line detecting means 1130 and the page width determining means 1140 respectively.

It shall be noted that, all the above means are exemplary preferable modules for implementing the page boundary detecting method of the present invention. However, the modules for implementing the various steps are not described exhaustively above. Generally, where there is a step of performing a certain process, there is a corresponding functional module or means for implementing the same process.

In addition, it shall be noted that, in FIGS. 11 and 12, two or more means may be combined as one means as long as their functions can be achieved; on the other hand, any one means may be divided into a plurality of means, as long as similar functions can be achieved.

It is possible to carry out the page boundary detecting method and apparatus of the present invention in various ways. For example, it is possible to carry out the page boundary detecting method and apparatus of the present invention through software, hardware, firmware or any combination thereof. Besides, in some embodiments, the present invention may also be embodied as programs recorded in recording medium, including machine-readable instructions for implementing the page boundary detecting method according to the present invention. Thus, the present invention also covers the recording medium which stores the program for implementing the page boundary detecting method according to the present invention.

While the present invention has been described with reference to exemplary embodiments, it is to be understood that the present invention is not limited to the disclosed exemplary embodiments. It is apparent to those skilled in the art that the above exemplary embodiments can be modified without departing from the scope and spirit of the present invention. The scope of the following claims is to be accorded the broadest interpretation so as to encompass all such modifications and equivalent structures and functions.

What is claimed is:

1. A method for detecting page boundaries of a book document image, comprising:
    an edge image detecting step for detecting an edge image from the book document image;
    a horizontal page boundary detecting step for detecting top page boundaries and bottom page boundaries on the edge image, wherein the horizontal page boundary detecting step includes
        a straight line segment detecting step for detecting a plurality of straight line segments on the edge image,
        a straight line part selecting step for selecting straight line parts of the top page boundaries and the bottom page boundaries from the plurality of straight line segments based on the following criteria:
            a) on a top side, a straight line segment of a top page boundary of a left page and a straight line segment of a top page boundary of a right page are approximately on the same straight line, and on a bottom side, a straight line segment of a bottom page boundary of the left page and a straight line segment of a bottom page boundary of the right page are approximately on the same straight line,
            b) on the top side, in case more than one pairs of straight line segments satisfy criterion a), if a vertical distance between an upper pair of straight line segments and a lower pair of straight line segments is larger than a pre-determined threshold, the upper pair of straight line segments is chosen as the straight line parts of the top page boundaries; otherwise the lower pair of straight line segments is chosen as the straight line parts of the top page boundaries; on the bottom side, in case more than one pairs of straight line segments satisfy criterion a), if a vertical distance between an upper pair of straight line segments and a lower pair of straight line segments is larger than a pre-determined threshold, the lower pair of straight line segments is chosen as the straight line parts of the bottom page boundaries; otherwise the upper pair of straight line segments is chosen as the straight line parts of the bottom page boundaries, and a curvature part detecting step for detecting curvature parts of the top page boundaries and the bottom page boundaries on the edge image based on the straight line parts of the top page boundaries and the bottom page boundaries;

a binding center line detecting step for detecting the binding center line by searching an intersection point of the left page and the right page on the top page boundaries and the bottom page boundaries;

a page width determining step for determining the page width of the book document image; and a vertical page boundary determining step for determining the left page boundary and the right page boundary by using the top page boundaries, the bottom page boundaries, the binding center line and the page width.

2. The method according to claim 1,
wherein in the straight line segment detecting step, the following pre-processing is performed:
for each column of the edge image, searching from top to bottom and only reserving the first several edge points that are met, wherein each reserved edge point when searching from top to bottom is required to be with darker color on its top side and lighter color on its bottom side, and
for each column of the edge image, searching from bottom to top and only reserving the first several edge points that are met, wherein each reserved edge point when searching from bottom to top is required to be with darker color on its bottom side and lighter color on its top side;
wherein the plurality of straight line segments are detected by using only the reserved edge points when searching from top to bottom and the reserved edge points when searching from bottom to top.

3. The method according to claim 1, wherein the page width determining step further comprises:
obtaining a value of width-to-height ratio of the book document from a user interface;
determining a page height of the book document image according to the vertical distance between the straight line parts of the top page boundaries and the bottom page boundaries; and
calculating the page width according to the width-to-height ratio and the page height.

4. The method according to claim 1, wherein the page width determining step further comprises:
detecting page corner points of the book document image on the edge image according to the top page boundaries and the bottom page boundaries; and
calculating the page width according to the page corner points and the binding center line.

5. The method according to claim 1, wherein in the vertical page boundary determining step, the horizontal positions of the vertical page boundaries are determined by referring to the binding center line and the page width, and the vertical page boundaries are determined by drawing two vertical lines that are orthogonal to the straight line parts of the horizontal page boundaries at the determined horizontal positions.

6. An apparatus for detecting page boundaries of a book document image, comprising:
an edge image detecting means for detecting an edge image from the book document image;
a horizontal page boundary detecting means for detecting top page boundaries and bottom page boundaries on the edge image, wherein the horizontal page boundary detecting means includes
straight line segment detecting means for detecting a plurality of straight line segments on the edge image,
straight line part selecting means for selecting the straight line parts of the top page boundaries and the bottom page boundaries from the plurality of straight line segments, wherein the straight line part selecting means selects the straight line parts of the top page boundaries and the bottom page boundaries based on the following selecting criteria:
a) on a top side, the straight line segment of a top page boundary of a left page and the straight line segment of a top page boundary of a right page are approximately on the same straight line, and on a bottom side, a straight line segment of a bottom page boundary of the left page and a straight line segment of a bottom page boundary of the right page are approximately on the same straight line,
b) on the top side, in case more than one pairs of straight line segments satisfy criterion a), if the vertical distance between an upper pair of straight line segments and a lower pair of straight line segments is larger than a pre-determined threshold, the upper pair of straight line segments is chosen as the straight line parts of the top page boundaries; otherwise the lower pair of straight line segments is chosen as the straight line parts of the top page boundaries; on the bottom side, in case more than one pairs of straight line segments satisfy criterion a), if the vertical distance between an upper pair of straight line segments and a lower pair of straight line segments is larger than a pre-determined threshold, the lower pair of straight line segments is chosen as the straight line parts of the bottom page boundaries; otherwise the upper pair of straight line segments is chosen as the straight line parts of the bottom page boundaries, and
curvature part detecting means for detecting the curvature parts of the top page boundaries and the bottom page boundaries on the edge image based on the straight line parts of the top page boundaries and the bottom page boundaries;
a binding center line detecting means for detecting the binding center line by searching an intersection point of the left page and the right page on the top page boundaries and the bottom page boundaries;
a page width determining means for determining the page width of the book document image; and
a vertical page boundary determining means for determining the left page boundary and the right page boundary by using the top page boundaries, the bottom page boundaries, the binding center line and the page width.

7. The apparatus according to claim 6,
wherein in the straight line segment detecting means, the following pre-processing is performed:
for each column of the edge image, searching from top to bottom and only reserving the first several edge points that are met, wherein each reserved edge point when searching from top to bottom is required to be with darker color on its top side and lighter color on its bottom side, and for each column of the edge image, searching from bottom to top and only reserving the first several edge points that are met, wherein each reserved edge point when searching from bottom to top is required to be with darker color on its bottom side and lighter color on its top side;

wherein in the straight line segment detecting means, the plurality of straight line segments are detected by using only the reserved edge points when searching from top to bottom and the reserved edge points when searching from bottom to top.

8. The apparatus according to claim 6, wherein the page width determining means further comprises:

means for obtaining a value of width-to-height ratio of the book document from a user interface;

means for determining a page height of the book document image according to the vertical distance between the straight line parts of the top page boundaries and the bottom page boundaries; and means for calculating the page width according to the width-to-height ratio and the page height.

9. The apparatus according to claim 6, wherein the page width determining means further comprises:

means for detecting page corner points of the book document image on the edge image according to the top page boundaries and the bottom page boundaries; and means for calculating the page width according to the page corner points and the binding center line.

10. The apparatus according to claim 6, wherein in the vertical page boundary determining means, the horizontal positions of the vertical page boundaries are determined by referring to the binding center line and the page width, and the vertical page boundaries are determined by drawing two vertical lines that are orthogonal to the straight line parts of the horizontal page boundaries at the determined horizontal positions.

* * * * *

UNITED STATES PATENT AND TRADEMARK OFFICE
CERTIFICATE OF CORRECTION

PATENT NO. : 8,675,969 B2
APPLICATION NO. : 13/037132
DATED : March 18, 2014
INVENTOR(S) : Lifeng Xu Page 1 of 1

It is certified that error appears in the above-identified patent and that said Letters Patent is hereby corrected as shown below:

On the Title Page, foreign priority data is missing, please add the following to the Title page:

Item (30) Foreign Application Priority Data

Mar 1, 2010  [CN]  201010116618.6

Signed and Sealed this
Seventh Day of April, 2015

Michelle K. Lee
*Director of the United States Patent and Trademark Office*